US010532744B2

(12) United States Patent
Tuukkanen et al.

(10) Patent No.: US 10,532,744 B2
(45) Date of Patent: Jan. 14, 2020

(54) APPARATUS, METHOD AND COMPUTER PROGRAM FOR CONTROLLING A VEHICLE

(71) Applicant: HERE Global B.V., Eindhoven (NL)

(72) Inventors: Marko Tuukkanen, Schlenzer (DE); Ari Aarnio, Espoo (FI); Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/105,295

(22) PCT Filed: Dec. 17, 2014

(86) PCT No.: PCT/EP2014/078205
§ 371 (c)(1),
(2) Date: Jun. 16, 2016

(87) PCT Pub. No.: WO2015/091637
PCT Pub. Date: Jun. 25, 2015

(65) Prior Publication Data
US 2016/0320193 A1 Nov. 3, 2016

(30) Foreign Application Priority Data
Dec. 19, 2013 (GB) .................................. 1322493.6

(51) Int. Cl.
*B60W 30/182* (2012.01)
*H04W 4/44* (2018.01)
(Continued)

(52) U.S. Cl.
CPC .......... *B60W 30/182* (2013.01); *B60W 30/09* (2013.01); *B60W 30/18* (2013.01);
(Continued)

(58) Field of Classification Search
CPC ......... B60W 2050/0078; B60W 30/14; B60W 40/072; B60W 10/184; B60W 30/182;
(Continued)

(56) References Cited

U.S. PATENT DOCUMENTS 5,570,285 A 10/1996 Asaka et al.
5,612,668 A 3/1997 Scott
(Continued)

FOREIGN PATENT DOCUMENTS

DE 10 2012 008659 A1 11/2012
EP 1 422 680 A2 5/2004
(Continued)

OTHER PUBLICATIONS

International Search Report and Written Opinion for Application No. PCT/EP2014/078204 dated Mar. 24, 2015.
(Continued)

*Primary Examiner* — Hunter B Lonsberry
*Assistant Examiner* — Luis A Martinez Borrero
(74) *Attorney, Agent, or Firm* — Alston & Bird LLP

(57) ABSTRACT

An apparatus, method and computer program wherein the apparatus comprises: processing circuitry; and memory circuitry including computer program code; the memory circuitry and the computer program code configured to, with the processing circuitry, cause the apparatus at least to perform: obtaining information from at least one sensor wherein the information comprises a current location of a vehicle; using the obtained information to determine an autonomous evacuation strategy for the vehicle; and enabling the vehicle to access the autonomous evacuation strategy when an emergency is detected.

19 Claims, 8 Drawing Sheets

Figure 1:
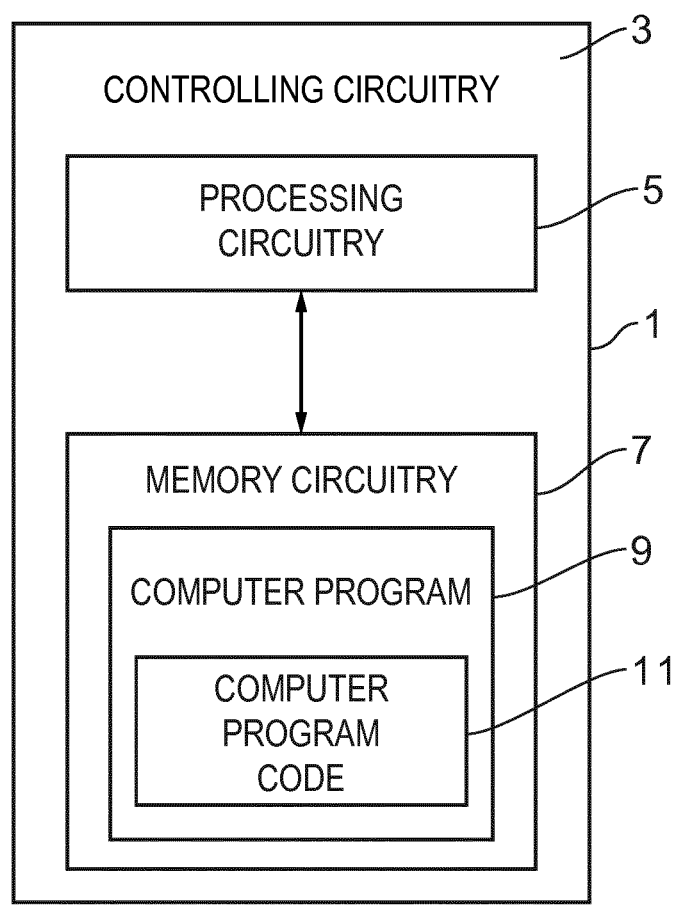

(51) Int. Cl.

| | |
|---|---|
| *B60W 30/09* | (2012.01) |
| *H04W 4/90* | (2018.01) |
| *G08G 1/0968* | (2006.01) |
| *G08G 1/00* | (2006.01) |
| *H04W 4/04* | (2009.01) |
| *G01C 21/34* | (2006.01) |
| *G08G 1/01* | (2006.01) |
| *B60W 50/00* | (2006.01) |
| *G05D 1/00* | (2006.01) |
| *B60W 30/18* | (2012.01) |
| *H04W 4/40* | (2018.01) |

(52) U.S. Cl.
CPC ......... *B60W 50/00* (2013.01); *G01C 21/3415* (2013.01); *G01C 21/3461* (2013.01); *G05D 1/0088* (2013.01); *G08G 1/0104* (2013.01); *G08G 1/0112* (2013.01); *G08G 1/0129* (2013.01); *G08G 1/096816* (2013.01); *G08G 1/096827* (2013.01); *G08G 1/096838* (2013.01); *G08G 1/096844* (2013.01); *G08G 1/205* (2013.01); *H04W 4/046* (2013.01); *H04W 4/40* (2018.02); *H04W 4/44* (2018.02); *H04W 4/90* (2018.02); *B60W 2050/0077* (2013.01); *B60W 2550/40* (2013.01); *B60W 2550/408* (2013.01); *B60W 2900/00* (2013.01)

(58) Field of Classification Search
CPC ................ G01C 21/3492; G01C 11/04; G01C 21/3423; G01C 21/20; G01C 21/3676; G01C 21/26; G01C 21/3694; G01C 21/36; G08G 1/0129; G08G 5/0069; G08G 1/0141; G08G 1/096827; G08G 5/0043; H04W 4/44; H04W 4/90
USPC ..... 701/117, 301, 28, 22, 70, 23, 400, 27, 3, 701/45
See application file for complete search history.

(56) References Cited

U.S. PATENT DOCUMENTS

| | | | | |
|---|---|---|---|---|
| 5,801,618 | A | 9/1998 | Jenkins | |
| 5,870,303 | A | 2/1999 | Trovato et al. | |
| 5,983,161 | A | 11/1999 | Lemelson et al. | |
| 6,393,362 | B1* | 5/2002 | Burns | G05D 1/0278 340/940 |
| 6,804,607 | B1 | 10/2004 | Wood | |
| 7,349,768 | B2* | 3/2008 | Bruce | G01C 21/005 701/1 |
| 7,426,437 | B2* | 9/2008 | Breed | B60N 2/2863 701/301 |
| 7,936,286 | B2* | 5/2011 | Adair | G08B 27/00 340/905 |
| 8,000,887 | B2* | 8/2011 | Nathan | G08G 1/096811 701/117 |
| 8,315,792 | B2* | 11/2012 | Speier | G01C 21/00 701/400 |
| 8,344,864 | B1 | 1/2013 | Al-Mutawa | |
| 8,406,986 | B2* | 3/2013 | Boss | B61L 27/04 701/117 |
| 8,494,675 | B2 | 7/2013 | Ichinose et al. | |
| 8,630,789 | B2* | 1/2014 | Speiser | G08G 1/01 340/915 |
| 8,738,276 | B1* | 5/2014 | Boss | B61L 27/04 455/404.1 |
| 8,849,551 | B2* | 9/2014 | Gadler | G01C 21/26 340/995.19 |
| 8,903,640 | B2 | 12/2014 | Caminiti et al. | |
| 9,464,907 | B1* | 10/2016 | Hoareau | G01C 21/3632 |
| 9,495,874 | B1 | 11/2016 | Zhu et al. | |
| 10,046,767 | B2* | 8/2018 | Tuukkanen | B60W 30/09 |
| 2002/0019703 | A1 | 2/2002 | Levine | |
| 2005/0231335 | A1 | 10/2005 | Miller, Jr. et al. | |
| 2006/0200302 | A1* | 9/2006 | Seko | G01C 21/26 701/532 |
| 2007/0043502 | A1 | 2/2007 | Mudalige et al. | |
| 2007/0075847 | A1 | 4/2007 | Oyagi et al. | |
| 2007/0152804 | A1 | 7/2007 | Breed et al. | |
| 2007/0198168 | A1* | 8/2007 | Nathan | G08G 1/096811 701/117 |
| 2007/0225993 | A1* | 9/2007 | Moore | G06Q 10/02 705/5 |
| 2008/0004790 | A1* | 1/2008 | Ames | G01C 21/3461 701/117 |
| 2008/0012693 | A1 | 1/2008 | Shimomura | |
| 2008/0012726 | A1* | 1/2008 | Publicover | G08G 1/095 340/932 |
| 2008/0046134 | A1* | 2/2008 | Bruce | G01C 21/005 701/1 |
| 2009/0027253 | A1 | 1/2009 | van Tooren et al. | |
| 2009/0030603 | A1* | 1/2009 | Madalin, Jr. | G01C 21/3691 701/533 |
| 2009/0228157 | A1 | 9/2009 | Breed | |
| 2009/0248219 | A1 | 10/2009 | Kawauchi et al. | |
| 2010/0121575 | A1 | 5/2010 | Aldridge et al. | |
| 2010/0305857 | A1 | 12/2010 | Byrne et al. | |
| 2011/0130636 | A1* | 6/2011 | Daniel | G08B 25/016 600/301 |
| 2011/0136463 | A1* | 6/2011 | Ebdon | G01C 21/20 455/404.1 |
| 2011/0264360 | A1* | 10/2011 | Boss | B61L 27/04 701/117 |
| 2012/0314074 | A1 | 12/2012 | Aimura et al. | |
| 2012/0316774 | A1* | 12/2012 | Yariv | G01C 21/26 701/423 |
| 2013/0018549 | A1 | 1/2013 | Kobana et al. | |
| 2013/0103309 | A1* | 4/2013 | Cai | G08B 7/066 701/515 |
| 2013/0116922 | A1* | 5/2013 | Cai | G01C 21/206 701/515 |
| 2013/0211656 | A1 | 8/2013 | An et al. | |
| 2013/0332402 | A1 | 12/2013 | Rakshit | |
| 2014/0129122 | A1* | 5/2014 | Boss | B61L 27/04 701/117 |
| 2015/0006012 | A1 | 1/2015 | Kammel et al. | |
| 2015/0170287 | A1 | 6/2015 | Tirone et al. | |
| 2017/0108342 | A1* | 4/2017 | Foreman | G01C 21/3415 |
| 2017/0199044 | A1* | 7/2017 | Hoareau | G01C 21/3632 |

FOREIGN PATENT DOCUMENTS

| | | |
|---|---|---|
| GB | 2 375 208 A | 11/2002 |
| GB | 2 383 431 A | 6/2003 |
| JP | S59109915 A | 6/1984 |
| JP | 2007 206915 A | 8/2007 |
| JP | 2010 020371 A | 1/2010 |
| WO | WO 2012/124877 A1 | 9/2012 |
| WO | WO 2013/072095 A1 | 5/2013 |
| WO | WO 2013/074983 A1 | 5/2013 |
| WO | WO 2013/100993 A1 | 7/2013 |
| WO | WO 2013/158355 A1 | 10/2013 |

OTHER PUBLICATIONS

International Search Report and Written Opinion for Application No. PCT/EP2014/078205 dated Mar. 23, 2015.

Kyung-Bok, S et al., *Autonomous Vehicle Guidance System With Infrastructure*, 7th International Conference on Signal Processing and Communication Systems (ICSPCS) IEEE (Dec. 2013) pp. 1-6.

Papadimitratos, P. et al., *Vehicular Communication Systems: Enabling Technologies, Applications, and Future Outlook on Intelligent Transportation*, IEEE Communications Magazine, vol. 47, No. 1 (Nov. 2009) pp. 84-95.

Sun, Q. et al., *Using Ad-hoc Inter-vehicle Networks For Regional Alerts*, Stanford, Technical Report (2005) 22 pages.

(56) References Cited

OTHER PUBLICATIONS

Self-driving cars offer big benefits if they can overcome hurdles [online] [retrieved Nov. 7, 2013]. Retrieved from the Internet: <URL: newsday.com/ .../self-driving-cars-offer-big-benefits-if-they-can-overcome-hurdles-1.6305713>. (dated Oct. 23, 2013) 3 pages.
Search Report for Great Britain Application No. GB 1322493.6 dated Jul. 25, 2014.
Search Report for Great Britain Application No. GB 1402374.1 dated Jul. 31, 2014.
U.S. Appl. No. 15/105,276, filed Jun. 16, 2016, in re: Tuukkanen et al., entitled An Apparatus, Method and Computer Program for Enabling Control of a Vehicle.
Office Action for U.S. Appl. No. 15/105,276 dated Oct. 27, 2017, 20 pages.
Examination Report for Great Britain Application No. GB1322493.6 dated May 23, 2019, 4 pages.
Examination Report for Great Britain Application No. GB1322493.6 dated Aug. 23, 2019, 2 pages.

\* cited by examiner

APPARATUS, METHOD AND COMPUTER PROGRAM FOR CONTROLLING A VEHICLE

CROSS REFERENCE TO RELATED APPLICATIONS

This application is a national stage 371 application of International Application No. PCT/EP2014/078205, filed Dec. 17, 2014, which claims priority to GB Application No. 1322493.6, filed Dec. 19, 2013, the entire contents of each are hereby incorporated by reference.

TECHNICAL FIELD

Examples of the present disclosure relate to an apparatus, method and computer program for controlling a vehicle. In particular, they relate to an apparatus, method and computer program for autonomously controlling a vehicle.

BACKGROUND

Apparatus and methods which enable autonomous control of vehicles, such as cars, are known. For example a vehicle may have a plurality of sensors located within the vehicle. This may enable information, such as the position of the vehicle, to be determined. The information obtained by the sensors may be provided to a controller and used to control the vehicle. For instance proximity sensors may be located on the body of a vehicle to detect the distance between a vehicle and other objects. This information may be used by a controller to autonomously drive the vehicle. For example the information may be used to guide the vehicle into and/or out of a parking space.

Where vehicles have autonomous capability it may be useful to use this to avoid certain situations for the vehicles and people around the vehicle.

BRIEF SUMMARY

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform: obtaining information from at least one sensor wherein the information comprises a current location of a vehicle; using the obtained information to determine an autonomous evacuation strategy for the vehicle; and enabling the vehicle to access the autonomous evacuation strategy when an emergency is detected.

In some examples obtaining information may comprise gathering information during journeys made by the vehicle.

In some examples obtaining information may comprise obtaining information from at least one remote server. The information obtained from the at least one remote server may comprise map information. The information obtained from the at least one remote server may comprise information personal to a user of the vehicle.

In some examples, the information obtained from the at least one sensor may be analysed to define at least one of a type of emergency, a critical level of the emergency.

In some examples the apparatus may be configured to enable the autonomous evacuation strategy to be implemented in response to detecting an emergency without any input from a user.

In some examples the apparatus may be configured to enable a user to remotely change the evacuation strategy.

In some examples the determined evacuation strategy may comprise moving the vehicle away from the detected emergency.

In some examples the determined evacuation strategy may comprise a safe parking location for the vehicle.

In some examples the determined evacuation strategy may comprise a route for the vehicle away from the current parking location of the vehicle.

In some examples the obtained information may comprise current information. The current information may comprise information relating to current traffic levels.

In some examples the evacuation strategy may be determined in response to the detection of the emergency.

In some examples the evacuation strategy may be at least partially determined before the emergency is detected.

In some examples the memory circuitry and the computer program code may be further configured to, with the processing circuitry, cause the apparatus to enable the vehicle to communicate with at least one other vehicle to determine an autonomous evacuation strategy for the vehicles.

In some examples the memory circuitry and the computer program code may be further configured to, with the processing circuitry, cause the apparatus to enable the vehicle to communicate with at least one other vehicle to implement an autonomous evacuation strategy for the vehicles.

In some examples there may be provided a vehicle comprising an apparatus as described above.

In some examples there may be provided a server comprising an apparatus as described above. The server may be configured to communicate with a vehicle.

According to various, but not necessarily all, examples of the disclosure there may be provided a method comprising: obtaining information from at least one sensor wherein the information comprises a current location of a vehicle; using the obtained information to determine an autonomous evacuation strategy for the vehicle; and enabling the vehicle to access the autonomous evacuation strategy when an emergency is detected.

In some examples obtaining information may comprise gathering information during journeys made by the vehicle.

In some examples obtaining information may comprise obtaining information from at least one remote server. The information obtained from the at least one remote server may comprise map information. The information obtained from the at least one remote server may comprise information personal to a user of the vehicle.

In some examples the information obtained from the at least one sensor may be analysed to define at least one of a type of emergency, a critical level of emergency.

In some examples the autonomous evacuation strategy may be implemented in response to detecting an emergency without any input from a user.

In some examples the method may further comprise receiving a signal from a user and in response to the received signal enabling a user to remotely change the evacuation strategy.

In some examples the determined evacuation strategy may comprise moving the vehicle away from the detected emergency.

In some examples the determined evacuation strategy may comprise a safe parking location for the vehicle.

In some examples the determined evacuation strategy may comprise a route for the vehicle away from the current parking location of the vehicle.

In some examples the obtained information may comprise current information. The current information may comprise information relating to current traffic levels.

In some examples the evacuation strategy may be determined in response to the detection of the emergency.

In some examples the evacuation strategy may be at least partially determined before the emergency is detected.

In some examples the method may further comprise enabling the vehicle to communicate with at least one other vehicle to determine an autonomous evacuation strategy for the vehicles.

In some examples the method may further comprise enabling the vehicle to communicate with at least one other vehicle to implement an autonomous evacuation strategy for the vehicles.

According to various, but not necessarily all, examples of the disclosure there may be provided a computer program comprising computer program instructions that, when executed by processing circuitry, enable: obtaining information from at least one sensor wherein the information comprises a current location of a vehicle; using the obtained information to determine an autonomous evacuation strategy for the vehicle; and enabling the vehicle to access the autonomous evacuation strategy when an emergency is detected.

In some examples there may be provided a computer program comprising program instructions for causing a computer to perform any of the methods described above.

In some examples there may be provided a physical entity embodying the computer programs as described above.

In some examples there may be provided an electromagnetic carrier signal carrying the computer programs as described above.

The apparatus may be for enabling autonomous driving of a vehicle. In some examples the apparatus may be located in the vehicle. In some examples the apparatus may be located remotely to the vehicle. For instance the apparatus could be located on a remote server. In such examples the apparatus may be configured to communicate with vehicle so as to enable autonomous control of the vehicle.

BRIEF DESCRIPTION

Figure 2:
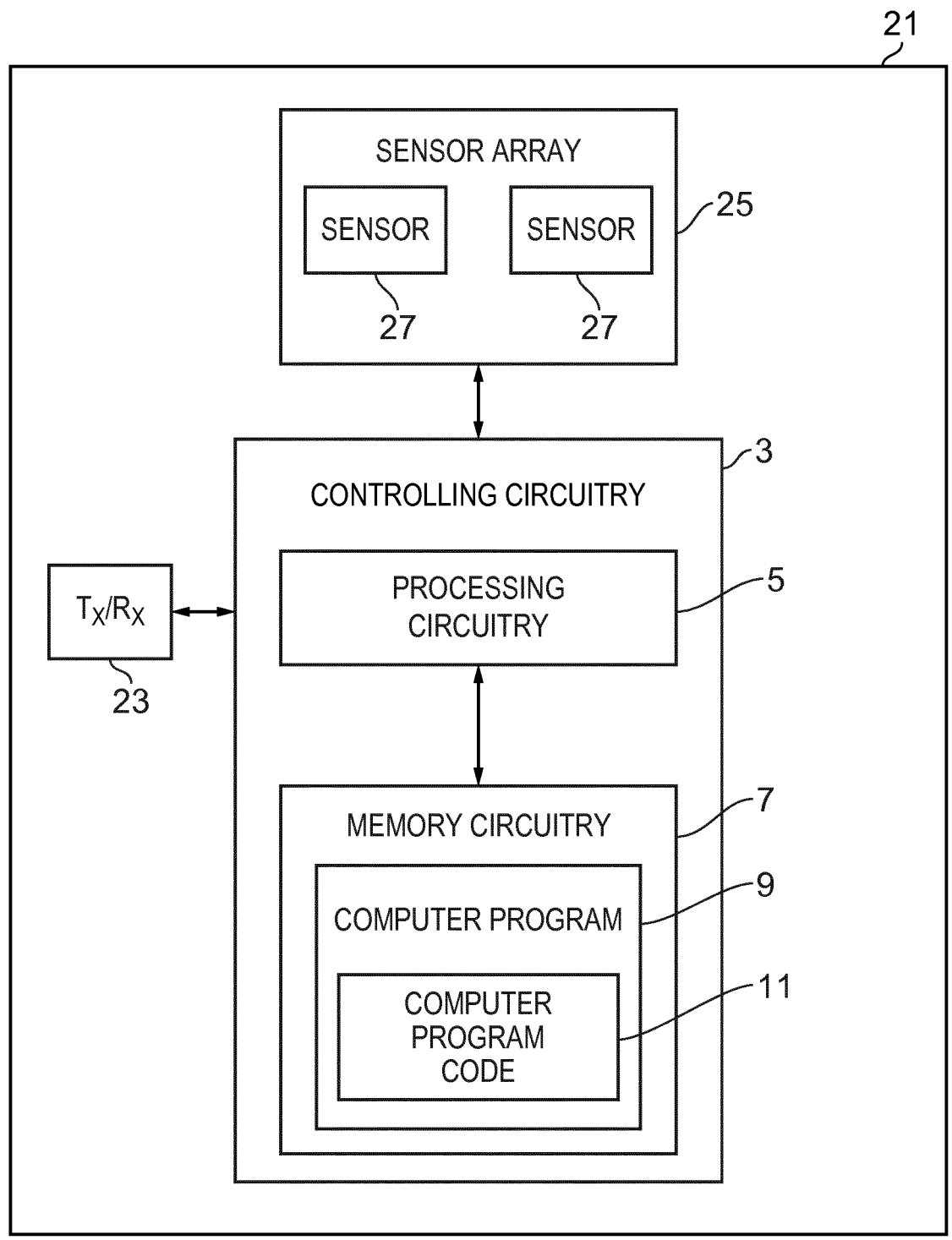
Figure 3:
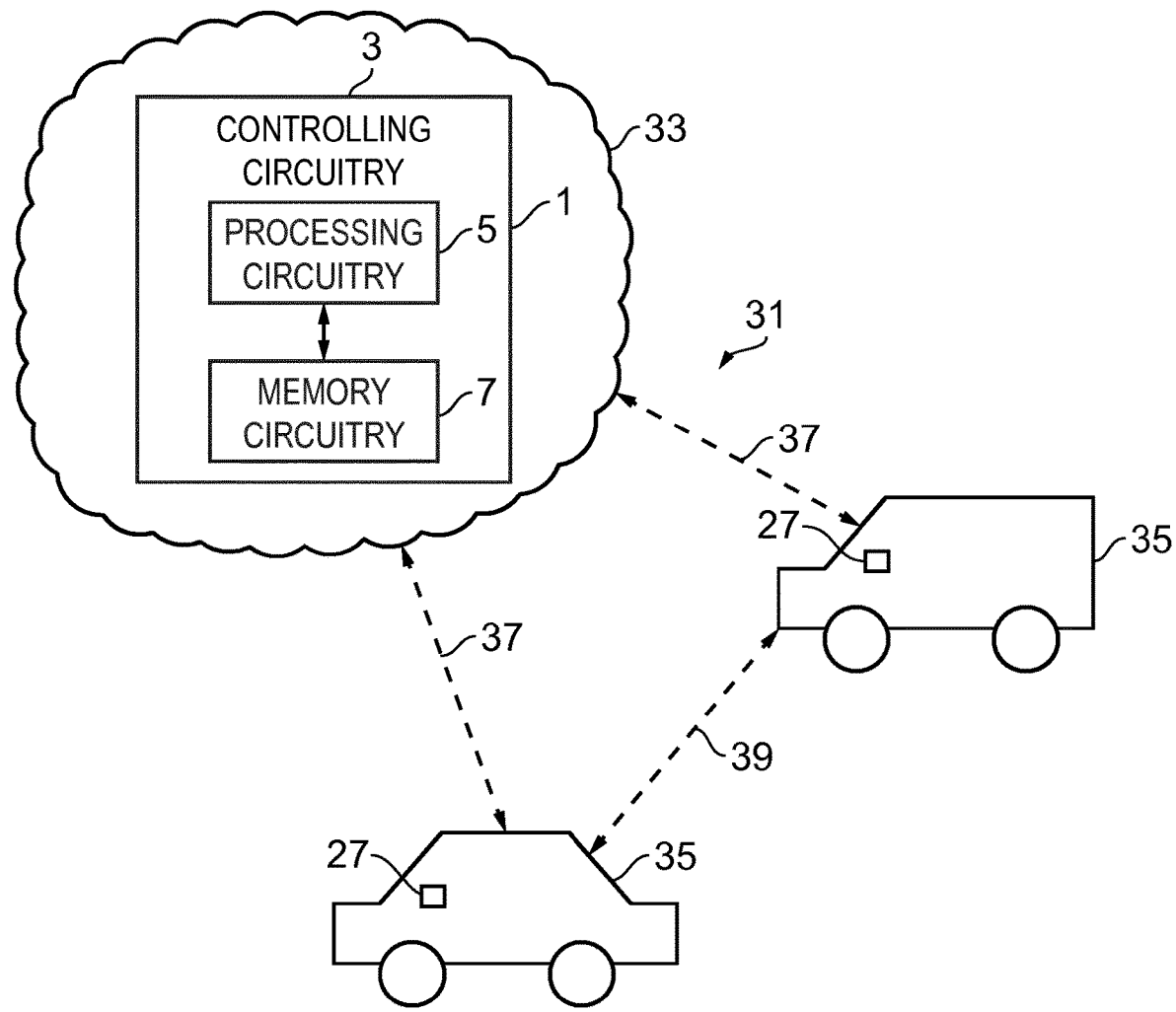
Figure 4:
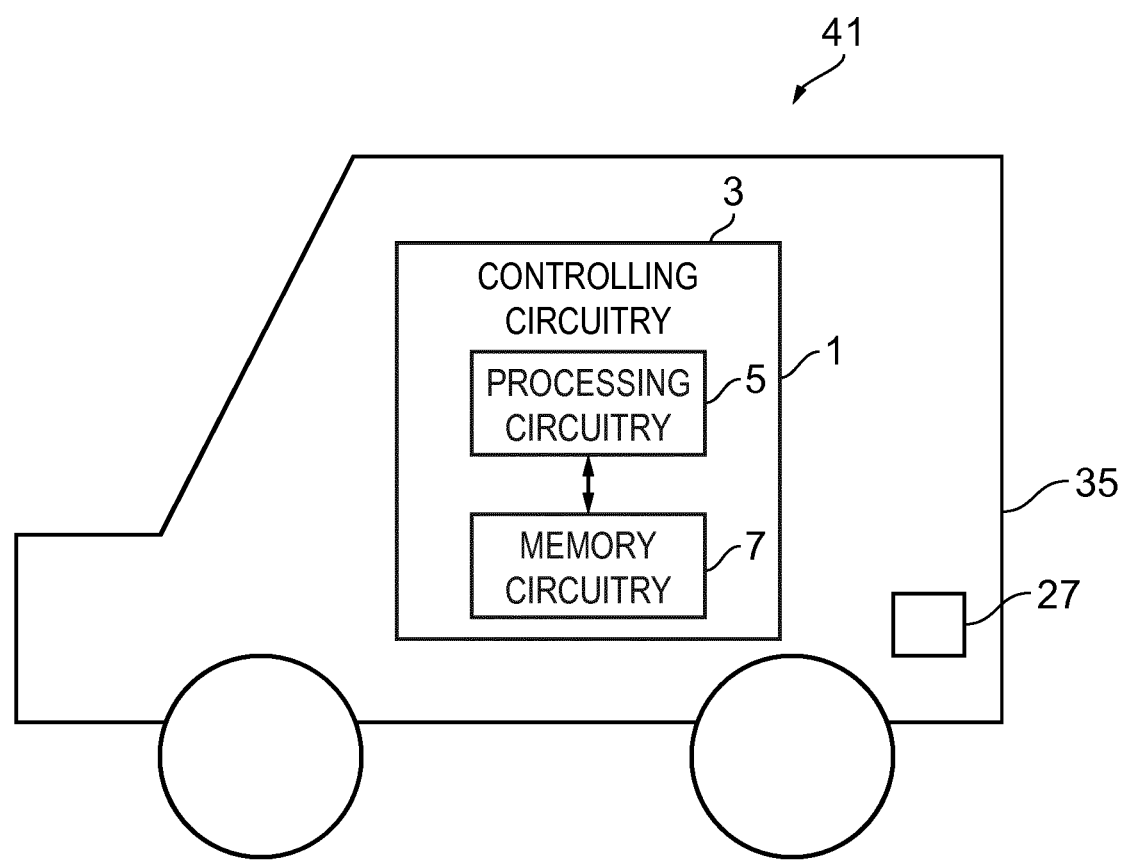
Figure 5:
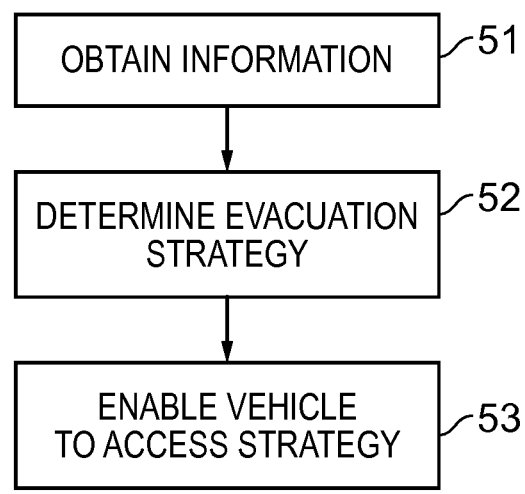
Figure 6:
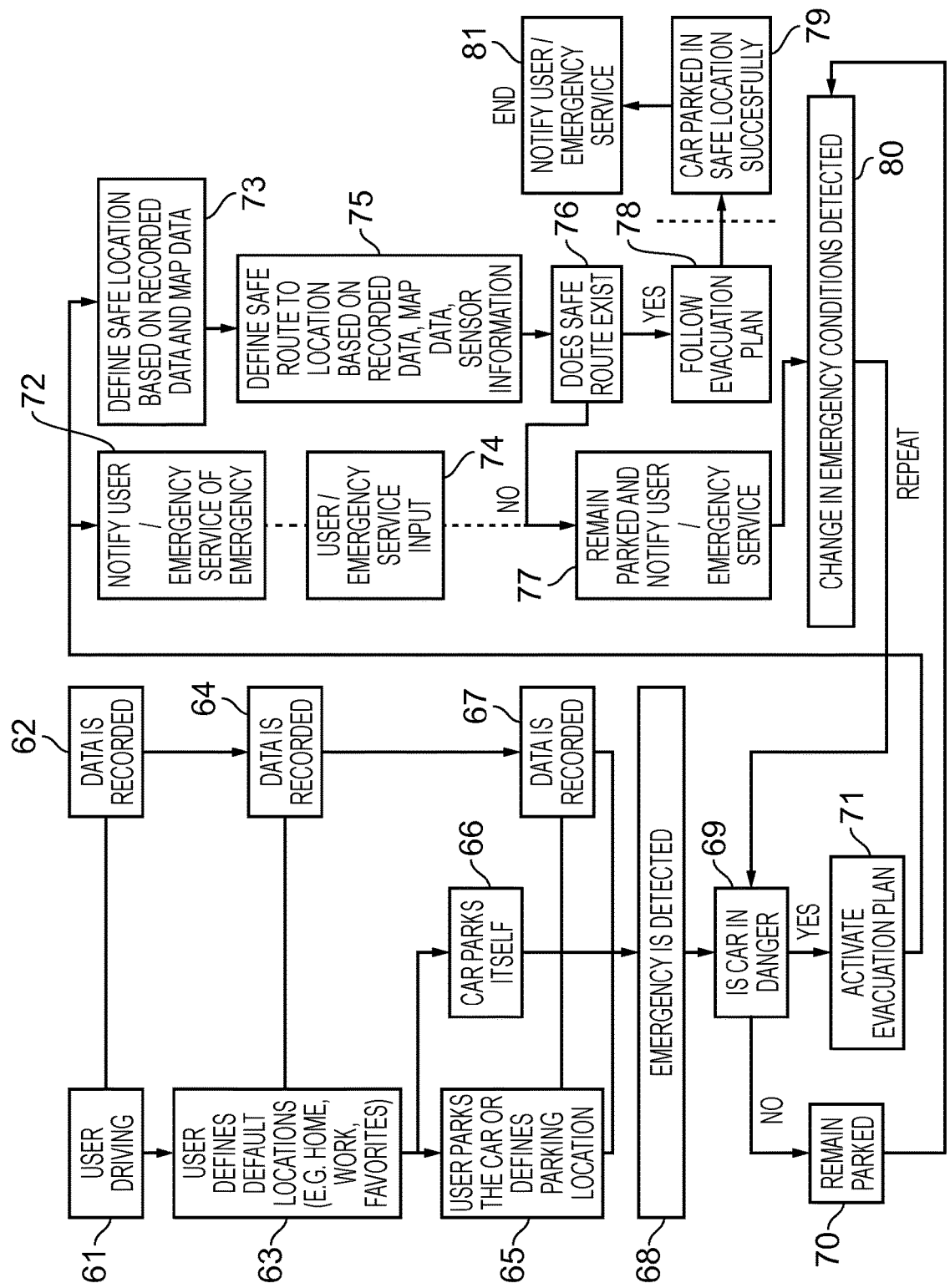
Figure 7:
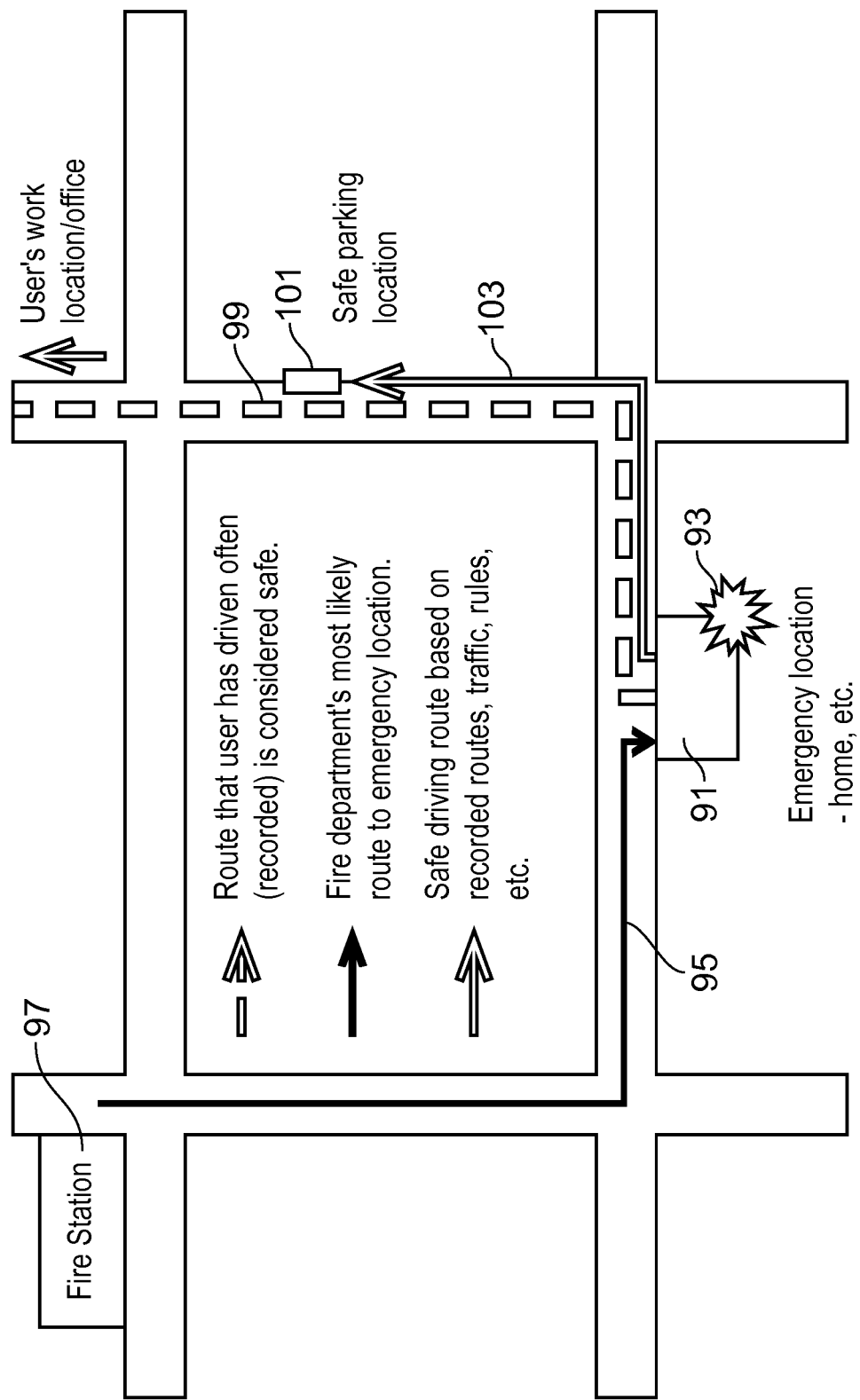
Figure 8:
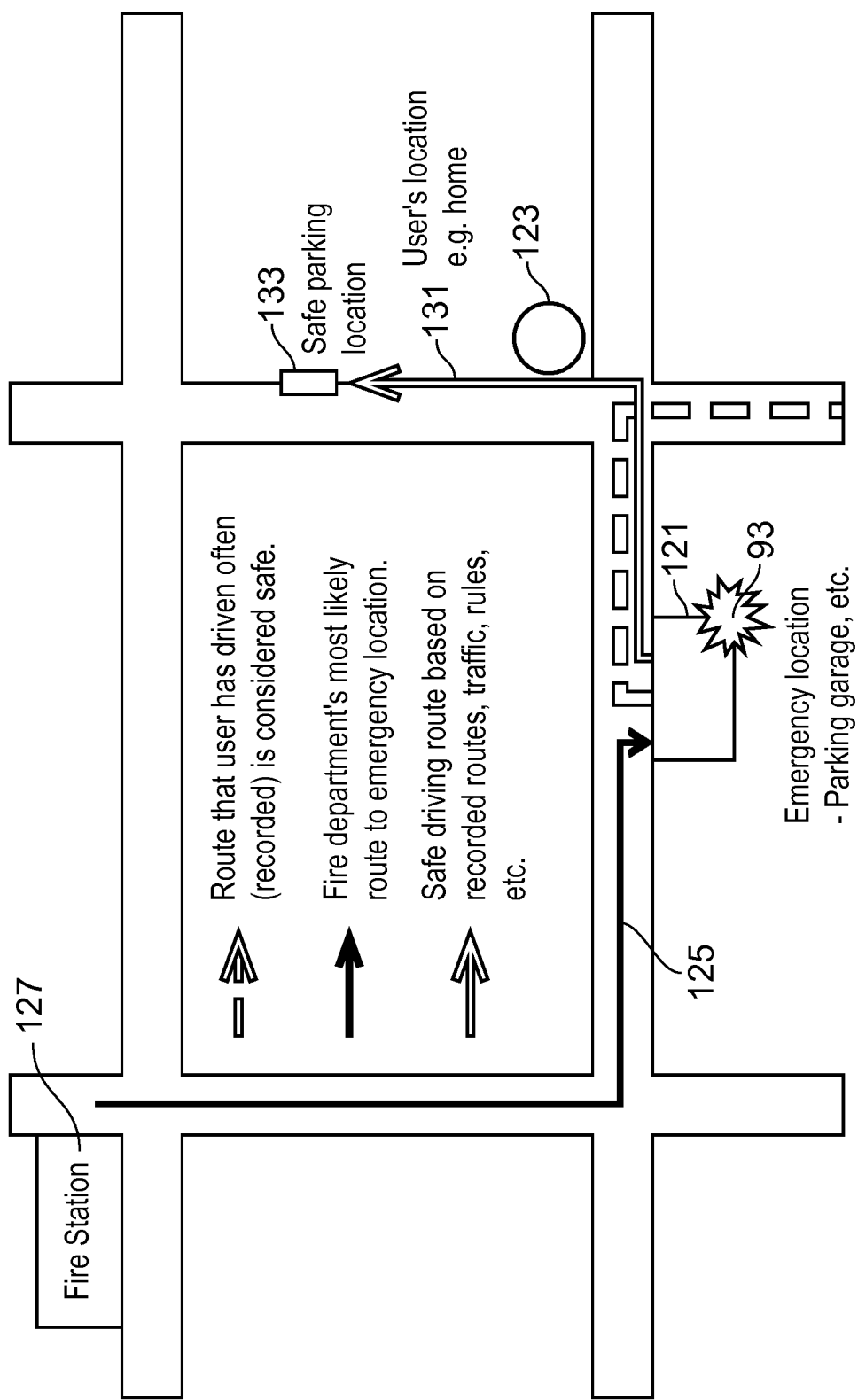

For a better understanding of various examples that are useful for understanding the detailed description, reference will now be made by way of example only to the accompanying drawings in which:

FIG. 1 illustrates an apparatus;
FIG. 2 illustrates an apparatus;
FIG. 3 illustrates a system comprising an apparatus;
FIG. 4 illustrates a system comprising an apparatus;
FIG. 5 illustrates a method;
FIG. 6 illustrates a method;
FIG. 7 illustrates an evacuation strategy and
FIG. 8 illustrates an evacuation strategy.

DETAILED DESCRIPTION

FIGS. 1 to 4 illustrate an apparatus 1 comprising: processing circuitry 5; and memory circuitry 7 including computer program code 11; the memory circuitry 7 and the computer program code 11 configured to, with the processing circuitry 5, cause the apparatus 1 at least to perform: obtaining 51 information from at least one sensor 27 wherein the information comprises the current location of a vehicle 35; using 52 the obtained information to determine an autonomous evacuation strategy for the vehicle; and enabling 53 the vehicle to access the autonomous evacuation strategy when an emergency is detected.

Examples of the disclosure provide a system for enabling a vehicle to be moved autonomously when an emergency is detected.

FIG. 1 schematically illustrates an example apparatus 1 which may be used in implementations of the disclosure. The apparatus 1 illustrated in FIG. 1 may be a chip or a chip-set. The apparatus 1 may be provided within a device such as a server which may be configured to communicate with a vehicle. In some examples the apparatus 1 may be provided within the vehicle itself.

The example apparatus 1 comprises controlling circuitry 3. The controlling circuitry 3 may provide means for enabling autonomous control of a vehicle. The autonomous control of a vehicle may be location based. The autonomous control of the vehicle may enable the vehicle to be driven and/or parked without direct control inputs from a user. The controlling circuitry 3 may comprise one or more controllers. The controlling circuitry 3 may be implemented using instructions that enable hardware functionality, for example, by using executable computer program instructions in a general-purpose or special-purpose processing circuitry 5 that may be stored on a computer readable storage medium (disk, memory etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enables the apparatus 1 to perform the example methods illustrated in FIGS. 5 and 6. The processing circuitry 5 by reading the memory circuitry 7 is able to load and execute the computer program 9.

The apparatus 1 therefore comprises: processing circuitry 5; and memory circuitry 7 including computer program code 11; the memory circuitry 7 and the computer program code 11 configured to, with the processing circuitry 5, cause the apparatus 1 at least to perform: obtaining information from at least one sensor 27 wherein the information comprises the current location of a vehicle; using the obtained information to determine an autonomous evacuation strategy for the vehicle; and enabling the vehicle to access the autonomous evacuation strategy when an emergency is detected.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 9. The apparatus may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates another example apparatus 21. The apparatus 21 of FIG. 2 may comprise controlling circuitry 3 a transceiver 23 and a sensor array 25. It is to be appreciated that only features necessary for the following description have been illustrated in FIG. 2. Other examples may comprise additional features such as a user interface to enable a user to control the apparatus 1.

The controlling circuitry 3 of FIG. 2 may be as illustrated in FIG. 1 and described above. Corresponding reference numerals are used for corresponding features.

The transceiver 23 may comprise one or more transmitters and/or receivers. The transceiver 23 may comprise any means which enables the apparatus 21 to establish a communication connection with a remote device and exchange information with the remote device. The communication connection may comprise a wireless connection.

In some examples the transceiver 23 may enable the apparatus to connect to a network such as a cellular network. In some examples the transceiver 23 may enable the apparatus 1 to communicate in local area networks such as wireless local area networks, Bluetooth networks or any other suitable network.

The sensor array 25 may comprise a plurality of sensors 27. The plurality of sensors 27 may comprise any means which may be configured to detect a physical parameter and provide an electrical signal indicative of the physical parameter. This may enable information about the environment of the vehicle to be obtained.

The plurality of sensors 27 may comprises a plurality of different types of sensors which may be configured to detect different physical parameters. The physical parameters could comprise the distance between the vehicle and other objects, the location of the vehicle, the temperature around the vehicle, a change in the temperature around the vehicle, the presence of smoke or other chemicals in the air around the vehicle or any other suitable physical parameter.

The sensor array 25 may comprise one or more sensors 27 which may be located within the apparatus 21 itself. For example the sensor array 25 may comprise global positioning system (GPS) sensors which may detect the position of the vehicle or motion sensors such as accelerometers which may detect movement such as vibrations of the vehicle.

In some examples the sensor array 25 may also comprise one or more sensors 27 which may be located external to the apparatus 21. The external sensors 27 may be configured to provide the electrical signals indicative of the sensed parameters to the apparatus 21. In some examples the external sensors 27 may be configured to provide the electrical signals indicative of the sensed parameters to the apparatus 21 via the transceiver 23. For example proximity sensors may be provided on the outside of a vehicle and may be configured to detect when an object is close to the vehicle. This information could then be transmitted to the apparatus 21 which may be located inside the vehicle.

The sensor array 25 may be configured to provide the information obtained from the sensors 27 to the controlling circuitry 3. The controlling circuitry 3 may store the obtained information in the memory circuitry 7 and/or use the information to enable autonomous control of a vehicle. In some examples of the disclosure the controlling circuitry 3 may analyse the obtained information to enable an emergency detected. The information obtained from the sensor array 25 may be analysed to define the type of emergency and/or a critical level of the emergency.

FIG. 3 illustrates an example system 31 comprising an apparatus 1 according to an example of the disclosure. The example system 31 comprises a server 33 and one or more vehicles 35.

The server 33 may comprise an apparatus 1 as described above in relation to FIG. 1. The server 33 may be located remotely from the one or more vehicles 35. The server 33 may be located within a communications network which may be accessed by the one or more vehicles 35.

The server 33 may be configured to establish one or more communication links 37 with the one or more vehicles 35. The communication links 37 may comprise wireless communication links. The wireless communication links may be part of a communications network such as cellular communications network or a local area network.

The communication links 37 may comprise any means which may enable information to be exchanged between the apparatus 1 in the server 33 and the one or more vehicles 35. The information which is exchanged may comprise information which is obtained by one or more sensors 27. For example, the vehicles 35 may comprise sensors 27 which may be configured to obtain information about the environment of the vehicle. This information could be provided to the apparatus 1 via the communication links 37.

In some examples the information which is exchanged may comprise information which enables the apparatus 1 to autonomously control the vehicle 35. For example the apparatus 1 may be configured to determine an evacuation strategy and enable the vehicles 35 to access the determined evacuation strategy. Each vehicle 35 may have a unique evacuation strategy. In some examples the evacuation strategy may be specific to the current location of the vehicle 35.

In the example of FIG. 3 the server 33 is configured to communicate with a plurality of different vehicles 35. It is to be appreciated that in other examples the server 33 might be configured to only communicate with a single vehicle 35.

The vehicles 35 may comprise sensors 27. The sensors 27 may comprise any means which may be configured to sense a parameter which may be used to enable autonomous driving and/or detecting an emergency situation. The sensors 27 may comprises proximity sensors, GPS sensors, heat detectors, infra red sensors, smoke detectors, audio detectors or any other suitable type of sensor 27.

The sensors 27 may be configured to provide the information obtained by the sensors 27 to the apparatus 1 via the communication link 37. In some examples the vehicle 35 may comprise processing circuitry so the signals received from the sensor 27 may be pre-processed before the information is sent to the apparatus 1.

In the example system 31 of FIG. 3 the vehicles 35 are also configured to enable a communication link 39 to be established between two vehicles 35. For example each of the vehicles 35 may comprise a transceiver and processing circuitry. The communication link 39 may comprise any means which may enable information to be exchanged between the two vehicles 35. The communication link 39 may comprise a wireless communication link. The communication link 39 may be part of a network such as a local area network. The communication link 39 may enable the vehicles 35 to coordinate an autonomous evacuation strategy.

FIG. 4 illustrates another system 41 according to another example of the disclosure. The system 41 comprises an apparatus 1 as described above in relation to FIG. 1 and a vehicle 35. In the example system 41 of FIG. 4 the apparatus 1 is located within the vehicle 35. The apparatus 1 may be configured to enable autonomous control of the vehicle 35.

The vehicle 35 may comprise sensors 27. As described above the sensors 27 may comprise any means which may be configured to sense parameters which may be used to enable autonomous driving and/or detecting an emergency situation. The sensors 27 may comprise, for example, one or more proximity sensors, GPS sensors, heat detectors, infra red sensors, smoke detectors, audio detectors or any other suitable type of sensor 27 or any combination thereof.

The sensors 27 may be configured to provide the information obtained by the sensors 27 to the apparatus 1. In some examples the sensors 27 may be located within the apparatus 1, for example the sensor 27 may comprise a GPS sensor or an accelerometer. In other examples the sensor 27 may be external to the apparatus 1. For example the apparatus 1 may be located inside the vehicle 35 while sensors 27 such as proximity sensors or heat detectors may be located on the outside of the vehicle 35. In such examples the apparatus 1 may comprise means for enabling the information obtained by the sensors 27 to be provided to the apparatus 1.

It is to be appreciated that other example systems may be implemented in which the processing circuitry 5 and memory circuitry 7 is distributed between apparatus 1 located within a vehicle 35 and apparatus 1 located within a communications network which is accessible by the vehicle 35.

FIGS. 5 and 6 are block diagrams which schematically illustrate example methods. The methods of FIGS. 5 and 6 may be implemented using the apparatus 1, 21 and systems 31, 41 as described above in relation to FIGS. 1 to 4.

FIG. 5 illustrates a method according to a first example method. The method comprises at block 51 obtaining information from at least one sensor 27. The information which is obtained comprises the current location of a vehicle 35. The method also comprises, at block 52, using the obtained information to determine an autonomous evacuation strategy for the vehicle 35. At block 53 the method comprises enabling the vehicle 35 to automatically access the autonomous evacuation strategy when an emergency is detected.

The method of FIG. 5 may be implemented by the apparatus 1. The apparatus 1 may be located within a vehicle 35 or within a server 33 which may be remote to the vehicle 35.

FIG. 6 illustrates a method according to another example. The method of FIG. 6 also enables a vehicle to detect an emergency situation and enable the vehicle to autonomously respond to the detected emergency.

At blocks 61, 63 and 65 information may be obtained by the apparatus 1. The information may comprise information which is obtained from one or more sensors 27. The one or more sensors 27 may be provided on the vehicle 35 as described above. The information obtained in blocks 61, 63 and 65 may be obtained prior to an emergency being detected.

At block 61 information is gathered during journeys made by the vehicle 35. In some examples 61 may be performed whenever the user makes a journey in the vehicle 35. At block 61 a user may be driving the vehicle 35. In some examples the user may be manually controlling the vehicle 35. In other examples the user may be in the vehicle 35 while the vehicle 35 is being controlled autonomously. While the vehicle 35 is being driven information may be obtained. The information may include information such as which routes are used. This could enable information such as a user's preferred routes and locations to be obtained. The information may be obtained using a sensor such as a GPS sensor or any other suitable means.

Once the information is obtained it may be stored at block 62. The information may be stored in memory circuitry 7 which could be located in the vehicle 35. In some examples the information may be transmitted to one or more remote servers 33. Having information relating to a user's preferred routes and locations may enable an evacuation strategy to incorporate routes and locations that the user is familiar with.

At block 63 a user may input information. In the particular example of FIG. 6, at block 63, the user defines default locations. The default locations could include a home location, a work location or any other favourite location or route. This may enable the user to define their preferred locations and routes. The information may be stored in an apparatus 1 within the vehicle 35 for example in a map application within the vehicle 35. In some examples the information may be stored in an apparatus 1 which is remote to the vehicle 35.

The information which is input by the user may be received by any suitable means. For example, in some implementations the user may be able to use a device such as a mobile phone or a computer to input their default locations. This information may then be transmitted to the apparatus 1 so that, at block 64 the information obtained from the user is stored. The information may be stored in the memory circuitry 7.

At block 65 a user parks the vehicle 35 or otherwise defines a current location of the vehicle 35. In examples where the user parks the vehicle 35 the location of the vehicle 35 may be determined using GPS radio frequency identification (RFID), wireless local area network (wireless LAN) or any other suitable positioning system.

In some examples the user may define the parking location. For example the user may have parked in their "home" location and may provide an input indicating that they have parked at "home". The user input may comprise a user actuating a button or other user input device in the vehicle after the vehicle has been parked.

The obtained information indicating the current location of the vehicle 35 is provided to the apparatus 1 so that, at block 67 the information indicating the current location of the vehicle 35 is stored. The information may be stored in the memory circuitry 7.

In other examples the vehicle 35 may be configured to park autonomously. This may enable a user to leave the vehicle 35 before it is parked. The vehicle 35 may then autonomously navigate into a parking space. The parking space may be a predefined parking space. For example the parking space may be defined by the user at block 63.

In some examples the method may also comprise obtaining information about a user's current location which may be different to the location of the vehicle. Information about the current location of the user may be achieved using any suitable technique. In some implementations information about a user's current location may be obtained by receiving information from a mobile device associated with a user. In some examples the vehicle and the user's mobile device may be configured to communicate with each other using local connectivity or may be configured to share information using cellular network and/or cloud services. In some examples the apparatus 1 may acquire information of the user's behaviour to determine the most likely location of the user. For example a user is most likely to be at work during normal work hours or at home during the night.

In some examples the apparatus 1 may also be configured to obtain information from at least one remote server. The information obtained from the at least one remote server may comprise map information. The map information could also include information relating to emergency services such as the locations or fire stations and hospitals and the routes between the emergency services and the current location of the vehicle 35. In some examples the emergency service routes may be designated in the maps. In some examples the information may comprise the current location of one or more emergency vehicles. This may enable the apparatus 1 to determine the routes that the emergency vehicles would take to the emergency.

In some examples the information obtained from the at least one remote server may comprise information which is personal to the user of the vehicle 35. For example the information could include the users' home and work locations.

In some examples the information which is obtained may comprise current information such as traffic information. This may enable current information such as the current traffic levels to be used to determine the evacuation strategy. In some embodiments a contingency strategy may be selected based on real time traffic information.

It is to be appreciated that the blocks of FIG. 6 which enable information to be obtained may be repeated as often as is necessary and/or appropriate. For example, block 61 may be carried out whenever a user is driving the vehicle 35. This may enable personalised and up to date information relating to the user to be obtained.

At block 68 an emergency is detected. The emergency may be detected using any suitable method. The emergency could be any situation in which the vehicle 35 and/or people or objects near the vehicle 35 are in a situation which may cause harm or damage. For example the emergency could be a fire in the building in which the vehicle is parked. Other emergencies could include storms which may cause trees to fall down or any other potentially dangerous situation.

In examples where the emergency comprises a fire the fire may be detected using any suitable means. In some examples the fire may be detected using sensors 27 provided within the vehicle 35. The sensors 27 may comprise infra red sensors which may be configured to detect heat or changes in temperature, photoelectric detectors or any other suitable means which may be configured to detect smoke, image sensors which may be configured to enable image recognition which may recognise flames, audio sensors which may be configured to detect the noise of a fire alarm, or any other suitable means.

In some examples the sensors 27 which are configured to detect the emergency may also be configured to obtain other information. For example infrared sensors may also be used as proximity sensors as well as for detecting a fire. This may reduce the total number of sensors 27 needed on the vehicle 35.

In other examples the apparatus 1 may receive an input signal to detect the emergency. For instance, if the fire alarm is triggered in a building near the vehicle then a signal may be provided to apparatus 1 indicating that an alarm has been raised. In some examples the user may make an input which is obtained by the apparatus 1 to provide a notification that there is an emergency. For example the user might hear the fire alarm and then make an input using a mobile device such as a mobile phone to indicate that an emergency has been detected and the evacuation strategy should be implemented.

In some examples the apparatus 1 may detect an emergency by detecting the movement of objects near to the vehicle. For example if a tree blows down in a storm the impact of the tree falling may cause vibrations which may be detected by sensors 27 such as accelerometers.

It is to be appreciated that other types of emergencies could be detected in other implementations of the system.

In some examples of the disclosure the sensors 27 may be configured to provide information relating to an emergency. The information obtained from the sensors 27 may be analysed to determine whether or not there is an emergency and/or to classify the type of emergency. The information may be obtained from a plurality of different sensors 27. This may enable different types of emergencies to be classified.

The apparatus 1 may be configured to determine the type of emergency. For example the apparatus 1 may be configured to use the information obtained from the sensors 27 and/or the user and/or the remote servers to distinguish between different types of emergency. The apparatus 1 may distinguish between different types of emergency, for example whether the emergency is a fire or a storm.

In other example the apparatus 1 may be configured to assign a critical level to the detected emergency so that the evacuation strategy for a particular critical level may be implemented. For instance if the vehicle 35 is parked in a building it may be detected that there is a fire in a different building which may be close by. This might not present any immediate danger to the vehicle 35 and so may be assigned a lower critical level than if the fire was in the building in which the vehicle 35 was located.

At block 69 it is determined whether or not the vehicle 35 is in danger. This may be achieved by assigning a critical level to the emergency. In other examples it may be achieved using any other suitable method such as determining the distance between the vehicle and the emergence 35.

If it is determined that the vehicle 35 is not in any danger then at block 70 the vehicle 35 remains parked. The apparatus 1 may continue to use the obtained information to monitor the conditions of the emergency situation. If, at block 80 a change in the emergency conditions is detected then the method returns to block 69 to repeat the check as to whether or not the vehicle 35 is in danger.

If it is determined that the vehicle 35 is in danger then at block 71 an evacuation strategy is activated.

At block 72 the apparatus 1 may provide a notification of the emergency. In some examples the notification may be provided to the user of the vehicle 35. For instance an alert may be provided to a mobile device belonging to the user. In some examples an alert maybe provided to the emergency services and/or to a public safety answering point (PSAP). In some emergencies the vehicles 35 may detect an emergency before any people do so this may enable the emergency services to respond more quickly.

At block 74 the apparatus 1 may receive an input from the user and/or the emergency services. The input may comprise information which may be used to determine the evacuation strategy.

In some examples the information which is received from the emergency services may provide an indication of the route which the emergency services will be taking to get to the emergency. This information may be used to ensure that the evacuation strategy does not cause the vehicle 35 to obstruct the emergency services.

In some examples of the disclosure the emergency services may provide the evacuation strategies to the vehicles 35. The evacuation strategy may be provided in response to the notification. This may enable a central resource, such as an emergency service, to control a plurality of vehicles 35 and ensure that the evacuation enables as many vehicles 35 as possible to safely leave the location of the emergency without obstructing or creating hazards for the emergency services.

In examples of the disclosure where the evacuation strategy is controlled by a central resource this may result in one or more vehicles 35 following a different evacuation strategy than the vehicle 35 would follow on their own. For example the centrally defined evacuation strategy may require a vehicle 35 to wait for other vehicles 35 to move. This may create a delay for some vehicles 35 but may enable as many vehicles 35 as possible to safely leave the location.

In some examples the information which is received from the user may provide an indication of the state of the user. For example if the user has suffered minor injuries the user might need the vehicle 35 to collect them and enable them to attend a hospital.

The information which is received from the user and/or emergency services may also enable the automatic evacuation strategy to be overridden so that at block 77 the vehicle 35 remains parked in its current location. For example the user and/or emergency service may have identified that there are other factors which may mean that it is safer for the vehicle 35 to remain in the current location. For instance, a fire alarm may have been activated accidentally.

At blocks 73, 75 and 76 an evacuation strategy is determined. The evacuation strategy may comprise moving the vehicle 35 away from the detected emergency. The evacuation strategy may comprise a safe parking location for the vehicle 35. The evacuation strategy may comprise a route for the vehicle 35 away from the current parking location.

At block 73 a safe parking location for the vehicle 35 is determined. The safe parking location may be determined using the information which is obtained at blocks 61, 63 and 65. For example the safe parking location may comprise a location which has been identified by the user at block 63. In some examples the safe parking location may comprise a location which has been obtained, at block 61, while the user is driving so the apparatus 1 knows the user is familiar with the safe parking location.

In some examples the safe parking location may be determined using information such as map data which may be obtained from a remote server. The map data may identify safe parking locations for the vehicle 35.

At block 75 a route to the safe parking location is defined. The route may be defined using map data which may be obtained from a remote server and/or using information which has been obtained at any of blocks 61, 63 and 65.

The apparatus 1 may also obtain current information from a remote server. The current information could include information relating to current traffic levels this may prevent the vehicle 35 from being caught in traffic congestion.

The route which is determined may avoid routes which may be used by emergency vehicles so as to prevent the vehicle 35 from causing an obstruction to any emergency vehicles.

At block 76 it is determined whether or not the determined route to the safe parking location is safe. If it is determined that the route is not safe then the method moves to block 77 and the vehicle 35 remains in its current location.

If the vehicle 35 is remaining in the current location a notification may be sent to the user and/or the emergency services. The notification may be sent to a mobile device of the user. This ensures that the user knows the location of the vehicle 35 and, if the user need to access a hospital the user knows that they need to find an alternative mode of transport.

In some examples the vehicle 35 may be configured to record data relating to the detected emergency and enable this data to be shared with the emergency services. For instance if a vehicle 35 is inside a garage which is on fire the vehicle 35 may be able to record images which could provide the emergency services with information relating to the source of the fire and any flammable materials near the fire.

The notification may be sent to the emergency services. This may enable the emergency services to control the emergency situation more effectively. For example if the emergency services know that there are parked vehicles within a burning building they can evaluate the risk of these vehicles catching fire. In some examples the emergency services may be able to send a notification to the vehicle 35 to override the evacuation strategy and instruct the vehicle 35 to move.

If, at block 76, it is determined that the route is safe then the method moves to block 78 and the evacuation strategy is followed. The apparatus 1 may enable a vehicle to access the evacuation strategy and autonomously move the vehicle 35 form the current location to a safe parking location.

In some examples of the disclosure the apparatus 1 may enable a notification of the evacuation strategy to be sent to a user and/or the emergency services and/or a PSAP. This may enable the recipient of the notification to approve the evacuation strategy before it is implemented. In some examples it may also enable the recipient to modify or override the evacuation strategy.

In some examples of the disclosure the emergency services and/or the PSAP may be kept up-to-date with evacuation strategies of vehicles 35 close to the emergency. In some examples emergency vehicles approaching the emergency may be provided with information to ensure that they use routes that are not blocked. The emergency services and/or PSAP may also be kept up-to-date with any changes in the evacuation strategies being implemented.

At block 79 the vehicle is parked in the safe parking location and at block 81 a notification may be sent to the user and/or emergency service to indicate the safe parking location. This may enable a user to find their vehicle 35. This may also provide useful information to the emergency services as they know that the vehicle 35 has been removed from the building.

In the example of FIG. 6 the evacuation strategy is determined in response to the emergency being detected. In some examples the evacuation strategy may be determined or partially determined before the emergency is detected. For example pre-defined safe routes may be stored in the memory circuitry 7 of the apparatus. In some examples the evacuation strategy could be created in response to a user pressing a button when they park the vehicle 35. This could cause the evacuation strategy to be created and downloaded to the vehicle 35. This may enable the evacuation strategy to be determined more quickly in response to the emergency being detected.

In some examples there may be a plurality of vehicles 35 parked close to each other. In such examples the vehicles 35 may be configured to communicate with each other to determine and/or implement an evacuation strategy. The vehicles 35 may establish a local network or may communicate through a server. The evacuation strategy may be for example, to have vehicles 35 closest to emergency move first.

As another example the evacuation strategy may be to have vehicles 35 closest to an exit to move first. This may create more room for vehicles 35 further away from the exit to move and so may be the most efficient way of enabling a plurality of vehicles 35 to evacuate a location.

In some examples the method may allow for the vehicle 35 already being damaged by the emergency. For example it may be detected that the vehicle 35 is on fire or that a tree has fallen on the vehicle 35. In such cases the vehicle 35 remains in the current location. A notification may be sent to the user and/or emergency services indicating that the vehicle 35 is on fire or that a tree has fallen down.

In some examples the method may allow for the evacuation strategy may take into account the evacuation plans of people. For example the apparatus 1 may obtain information indicating the locations of people so that the planned evacuation route can avoid routes where there are likely to be a large number of people.

In some examples the method may allow for the user of the vehicle 35 to be collected from a pick up point. For example a user could be picked up outside the building they are in or a convenient exit of the building they are in. The pickup point may be communicated from the apparatus 1 to the mobile device of the user. This may be particularly useful if the user has suffered injuries and needs to go to hospital.

In some examples the vehicle 35 may be configured to access remote servers to implement the evacuation strategy. This may be useful as it may enable current information such as traffic updates to be incorporated in the evacuation strategy. This may make the evacuation strategy more efficient. In other examples the vehicle 35 may be configured to access the evacuation strategy without accessing a remote server. In such examples all information needed to determine the evacuation strategy may be stored in memory circuitry 7 within the vehicle. This may enable the vehicle 35 to implement an evacuation strategy without connecting to any other device. This may be beneficial as an emergency situation may cause damage to the infrastructure which enables the vehicle 35 to connect to a network.

In some examples the evacuation strategy may be implemented in response to the emergency being detected without any input from a user. This may enable the vehicle 35 to respond quickly and efficiently to an emergency situation.

The blocks illustrated in the FIGS. 5 and 6 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

FIG. 7 illustrates an example evacuation strategy. The example of FIG. 7 may be implemented using apparatus and systems as described above in relation any of FIGS. 1 to 4.

In the example of FIG. 7 the vehicle is parked in a location 91 such as the user's home when the emergency 93 is detected. In the example of FIG. 7 the emergency 93 is a fire.

The arrow 95 indicates the route that the fire department is most likely to take from the fire station 97 to the user's home 91. When determining the evacuation strategy the apparatus 1 may look to avoid this route to avoid creating an obstruction for the fire department.

The arrow 99 indicates a route that the user has driven often. This route may have been recorded while the user was driving the vehicle. When determining the evacuation strategy the apparatus 1 may look to incorporate this route as they know it is one the user is familiar with.

The arrow 103 indicates the route to the safe parking location 101. The route may be determined using the methods described above with reference to FIGS. 5 and 6. In the example of FIG. 7 the route coincides with a part of the route that the user has driven often.

It is to be appreciated that other users may have other routes that they have driven often. Therefore another user, even in the same household may have a different evacuation strategy.

Once the route 103 has been determined the vehicle 35 may be moved autonomously to the safe parking locations 101.

FIG. 8 illustrates another example evacuation strategy. The example of FIG. 8 may be implemented using apparatus and systems as described above in relation any of FIGS. 1 to 4.

In the example of FIG. 8 the vehicle is parked in a location such as a garage 121 which may be different to the location of the user's home 123. In the example of FIG. 8 the emergency 93 is a fire.

The arrow 125 indicates the route that the fire department is most likely to take from the fire station 127 to the garage 121. When determining the evacuation strategy the apparatus 1 may look to avoid this route to avoid creating an obstruction for the fire department.

The arrow 129 indicates a route that the user has drive often. For example this could be the route that the user drives to work. This route may have been recorded while the user was driving the vehicle. When determining the evacuation strategy the apparatus 1 may look to incorporate this route as they know it is one the user is familiar with.

The arrow 133 indicates the route to the safe parking location 131. The route may be determined using the methods described above with reference to FIGS. 5 and 6. In the example of FIG. 8 the route is different to the route that the user has driven often. In the example of FIG. 8 the route 133 passes the user's home location. This enables the vehicle 35 to be parked close to the user and may enable the user to be picked up or collected by the vehicle 35.

Once the route 133 has been determined the vehicle 35 may be moved autonomously to the safe parking location 131.

Apparatus and methods as described above enable vehicles to be moved from a potentially dangerous location to a safer location. This may reduce the risk posed by vehicles, for examples vehicles may have petrol within them which could easily catch fire.

As the vehicle can move autonomously there is no need for any input from the user. This may make the system more efficient than relying on user control.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example in the above mentioned examples the vehicle is moved if it is determined that the vehicle is in danger. In other examples the vehicle 35 might not be in any danger but could be could be causing an obstruction, for instance the vehicle could be parked adjacent to a fire hydrant which the emergency services may need to access. In such examples the apparatus 1 may be configured to recognise that the vehicle is causing a potential obstruction and enable the evacuation strategy to be accessed.

In some examples the apparatus 1 may comprise a map application which may provide a user interface. The user interface may enable a user to select an evacuation strategy from the maps application to be used if an emergency is detected in a particular location. In some examples the city or area in which the vehicle 35 is located may have a centralised collection of evacuation strategies. In such examples the map application may be configured to access the most appropriate evacuation strategy for the current location of the vehicle 35. The evacuation strategy may be specific to the particular parking space of the vehicle 35. In other examples the evacuation strategies may be embedded in the map application and/or route planner used by the vehicle. In some examples the evacuation strategy may be accessible whenever the vehicle 35 is in a location or is stopped in a location which has an associated evacuation strategy.

In some examples other buildings or entities may be able to propose safe parking locations to an apparatus 1. For example if an emergency is detected in a first location, such as a commercial parking garage, other parking garages which may be located nearby may be configured to provide information relating to their available capacity. In some examples the other parking garages may propose that vehicles 35 exit the first location and park in the safe location instead. The other parking garages may indicate how many vehicles 35 they can accommodate.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   processing circuitry; and
   memory circuitry including computer program code;
   the memory circuitry and the computer program code configured to, with the processing circuitry, cause the apparatus at least to perform:
   obtaining information from at least one sensor wherein the information comprises a current location of a vehicle;
   receiving an indication of an emergency;
   obtaining information regarding a route of emergency responders responding to the emergency;
   using the obtained information regarding the current location of the vehicle and the route of emergency responders to determine an autonomous evacuation strategy for the vehicle, wherein the autonomous evacuation strategy comprises a destination parking location determined to be familiar to a user of the vehicle based on one or more previous routes taken by the vehicle and determined to have available capacity;
   enabling the vehicle to access the autonomous evacuation strategy including a route of the autonomous evacuation strategy in response to detecting the emergency; and
   at least partially autonomously controlling the vehicle to proceed along the route of the autonomous evacuation strategy from the current location of the vehicle to the destination parking location, wherein obtaining information from the at least one sensor further comprises gathering information during the one or more previous routes taken by the vehicle.

2. The apparatus of claim 1 wherein obtaining information comprises obtaining information from at least one remote server.

3. The apparatus according to claim 2 wherein the information obtained from the at least one remote server comprises one or more of map information and information personal to a user of the vehicle.

4. The apparatus according to claim 1 wherein the information obtained from the at least one sensor is analysed to define at least one of a type of emergency, a critical level of emergency.

5. The apparatus according to claim 1 wherein the apparatus is configured to enable the autonomous evacuation strategy to be implemented in response to receiving an indication of an emergency without any input from a user.

6. The apparatus according to claim 1 wherein the apparatus is configured to enable a user to remotely change the evacuation strategy.

7. The apparatus according to claim 1 wherein the determined evacuation strategy comprises one or more of moving the vehicle away from the detected emergency and a route for the vehicle away from the current location of the vehicle.

8. The apparatus according to claim 1 wherein the obtained information regarding a route of emergency responders responding to the emergency comprises current traffic information.

9. The apparatus according to claim 1 wherein the evacuation strategy is determined by one or more of in response to receiving the indication of the emergency and at least partially determined before receiving the indication of the emergency.

10. The apparatus according to claim 1, wherein the memory circuitry and the computer program code are further configured to, with the processing circuitry, cause the apparatus to enable the vehicle to communicate with at least one other vehicle to determine an autonomous evacuation strategy for the vehicles.

11. The apparatus according to claim 1, wherein the memory circuitry and the computer program code are further configured to, with the processing circuitry, cause the apparatus to enable the vehicle to communicate with at least one other vehicle to implement an autonomous evacuation strategy for the vehicles.

12. The apparatus according to claim 1, wherein the apparatus is a mobile phone further comprising: user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

13. The apparatus of claim 1, wherein using the obtained information regarding the current location of the vehicle and the route of emergency responders to determine an autonomous evacuation strategy for the vehicle comprises determining an autonomous evacuation strategy that avoids the route of emergency responders responding to the detected emergency.

14. The apparatus of claim 1, wherein the delay is based on allowing other vehicles proceed along the route of the autonomous evacuation strategy ahead of the vehicle.

15. The apparatus of claim 1, wherein the vehicle is moved autonomously to the parking location.

16. The apparatus of claim 1, wherein upon arrival to the parking space by the vehicle, a notification is sent to the user to indicate the parking location.

17. The apparatus of claim 1, wherein the processing circuitry is further configured to receive an indication from a parking facility regarding available capacity at the parking facility.

18. A method comprising:
obtaining information from at least one sensor wherein the information comprises a current location of a vehicle;
receiving an indication of an emergency;
obtaining information regarding a route of emergency responders responding to the emergency;
using the obtained information regarding the current location of the vehicle and the route of emergency responders to determine an autonomous evacuation strategy for the vehicle, wherein the autonomous evacuation strategy comprises a destination parking location determined to be familiar to a user of the vehicle based on one or more previous routes taken by the vehicle and determined to have available capacity;
enabling the vehicle to access the autonomous evacuation strategy including a route of the autonomous evacuation strategy in response to detecting the emergency; and
at least partially autonomously controlling the vehicle to proceed along the route of the autonomous evacuation strategy from the current location of the vehicle to the destination parking location,
wherein obtaining information from the at least one sensor further comprises gathering information during the one or more previous routes taken by the vehicle.

19. A non-transitory computer readable medium including one or more sequences of one or more instructions which, when executed by one or more processors, cause an apparatus to at least perform at least a method comprising:
obtaining information from at least one sensor wherein the information comprises a current location of a vehicle;
receiving an indication of an emergency;
obtaining information regarding a route of emergency responders responding to the emergency;
using the obtained information regarding the current location of the vehicle and the route of emergency responders to determine an autonomous evacuation strategy for the vehicle, wherein the autonomous evacuation strategy comprises a destination parking location determined to be familiar to a user of the vehicle based on one or more previous routes taken by the vehicle and determined to have available capacity;
enabling the vehicle to access the autonomous evacuation strategy including a route of the autonomous evacuation strategy in response to detecting the emergency; and
at least partially autonomously controlling the vehicle to proceed along the route of the autonomous evacuation strategy from the current location of the vehicle to the destination parking location,
wherein obtaining information from the at least one sensor further comprises gathering information during the one or more previous routes taken by the vehicle.

* * * * *